US011833688B2

(12) United States Patent
Li

(10) Patent No.: US 11,833,688 B2
(45) Date of Patent: Dec. 5, 2023

(54) LEGGED ROBOTS AND METHODS FOR CONTROLLING LEGGED ROBOTS

(71) Applicant: PETOI, LLC, Pittsburgh, PA (US)

(72) Inventor: Rongzhong Li, Pittsburgh, PA (US)

(*) Notice: Subject to any disclaimer, the term of this patent is extended or adjusted under 35 U.S.C. 154(b) by 479 days.

(21) Appl. No.: 16/956,676

(22) PCT Filed: Jan. 7, 2019

(86) PCT No.: PCT/US2019/012497
§ 371 (c)(1),
(2) Date: Jun. 22, 2020

(87) PCT Pub. No.: WO2019/136356
PCT Pub. Date: Jul. 11, 2019

(65) Prior Publication Data
US 2020/0324411 A1  Oct. 15, 2020

Related U.S. Application Data

(60) Provisional application No. 62/614,749, filed on Jan. 8, 2018.

(51) Int. Cl.
*B25J 9/16*     (2006.01)
*B25J 9/00*     (2006.01)
(Continued)

(52) U.S. Cl.
CPC ............ *B25J 9/1664* (2013.01); *A63H 11/18* (2013.01); *A63H 11/20* (2013.01); *B25J 9/0009* (2013.01);
(Continued)

(58) Field of Classification Search
CPC .... A63H 11/18; A63H 11/20; A63H 2200/00; B25J 11/0005; B25J 11/003;
(Continued)

(56) References Cited

U.S. PATENT DOCUMENTS 5,644,204 A * 7/1997 Nagle .................. B62D 57/032
                                                   318/568.25
6,484,068 B1 * 11/2002 Yamamoto ........... B62D 57/032
                                                   901/1
(Continued)

FOREIGN PATENT DOCUMENTS

CN      104554510 A1    1/2017
CN      108773426 A1    11/2018

*Primary Examiner* — Rina I Duda

(57) ABSTRACT

Legged robots and methods for controlling legged robots are disclosed. In some examples, a mobile robot includes a frame, legs, and a control system. The mobile robot includes, for each leg, a motor coupled to the frame, the motor comprising a motor arm and a spring attachment point, the motor being configured to rotate the motor arm and the spring attachment point. The mobile robot includes, for each leg, a spring coupled to the spring attachment point of the motor and the leg, wherein the leg includes a track shaped to receive the motor arm, and wherein the leg is coupled to the spring such that the motor arm is within the track. The control system is configured, e.g., by virtue of appropriate programming, to control the motors to cause the mobile robot to move.

10 Claims, 11 Drawing Sheets

(51) Int. Cl.
  *B25J 9/12*   (2006.01)
  *B25J 11/00*  (2006.01)
  *B25J 13/08*  (2006.01)
  *B25J 19/00*  (2006.01)
  *B62D 57/032* (2006.01)
  *A63H 11/18*  (2006.01)
  *A63H 11/20*  (2006.01)
(52) U.S. Cl.
  CPC ............... *B25J 9/126* (2013.01); *B25J 9/161* (2013.01); *B25J 9/1653* (2013.01); *B25J 9/1697* (2013.01); *B25J 11/003* (2013.01); *B25J 11/0005* (2013.01); *B25J 13/085* (2013.01); *B25J 19/0016* (2013.01); *B62D 57/032* (2013.01); *G05B 2219/45083* (2013.01)
(58) Field of Classification Search
  CPC .. B25J 13/085; B25J 17/0208; B25J 19/0016; B25J 9/0009; B25J 9/126; B25J 9/161; B25J 9/1653; B25J 9/1664; B25J 9/1697; B62D 57/032; G06N 3/008
  USPC ........................................................ 318/568
  See application file for complete search history.

(56) References Cited

U.S. PATENT DOCUMENTS

| | | | | |
|---|---|---|---|---|
| 6,865,446 | B2 * | 3/2005 | Yokono | B25J 9/1633 |
| | | | | 700/257 |
| 8,483,873 | B2 * | 7/2013 | Wong | G06N 3/008 |
| | | | | 700/245 |
| 8,870,967 | B2 * | 10/2014 | Herr | A61F 2/70 |
| | | | | 623/47 |
| 10,532,464 | B1 * | 1/2020 | Guzman | B25J 19/005 |
| 2012/0022688 | A1 | 1/2012 | Wong et al. | |
| 2016/0347387 | A1 | 12/2016 | Hurst et al. | |

\* cited by examiner

OpenCat Communication Protocol and Parsing

| Interface | Token | Encoding | Parameters | | | | | Format | Bytes | Function |
|---|---|---|---|---|---|---|---|---|---|---|
| Microcontroller Serial Monitor | 'h' | Ascii | | | | | | char | 1 | print help information |
| | 'c' | | idx, ang | | | | | string | strlen + 2 | calibrate servo_idx by angle |
| | 'm' | | idx, ang | | | | | string | strlen + 2 | move servo_idx to angle |
| | 'd' | | | | | | | char | 1 | shut down servos |
| | 'p' | | | | | | | char | 1 | pause motion |
| | 'a' | | | | | | | char | 1 | abandon calibration |
| | 's' | | | | | | | char | 1 | save calibration |
| | 'k' | | abbreviation of skill | | | | | string | strlen + 2 | load skill |
| | 'w' | | command | | | | | string | strlen + 2 | some future command words |
| Master Computer Serial Port | 'r' | Binary | | | | | | char | 1 | reset board |
| | 'i' | | len | idx_1 | ang_1 | ... | idx_n ang_n | string | len + 2 | list of indexed rotation angles |
| | 'l' | | ang_1 | | ang_2 | ... | ang_DoF | string | DoF + 1 | list of all DoF rotation angles |

FIG. 18

LEGGED ROBOTS AND METHODS FOR CONTROLLING LEGGED ROBOTS

CROSS-REFERENCE TO RELATED PATENT APPLICATIONS

This application claims the benefit of, and priority to, U.S. Provisional Patent Applications Ser. No. 62/614,749, filed Jan. 8, 2018, entitled LEGGED ROBOTS AND METHODS FOR CONTROLLING LEGGED ROBOTS, which is incorporated by reference herein.

BACKGROUND OF THE INVENTION

This application relates generally to legged robots and computer systems for controlling legged robots. Legged robots are mobile robots that use one or more mechanical limbs for movement. For example, some one-legged robots use a hopping motion for navigation, and two-legged robots can exhibit bipedal motion. Four-legged (quadrupedal) robots can exhibit quadrupedal motion and may have increased stability compared to two-legged robots. Legged robots can be useful for, e.g., entertainment and companionship as toy robots and pet robots. Legged robots can also be useful for completing other tasks in environments with varied terrains where wheeled robots may not be able to navigate.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

BRIEF SUMMARY OF INVENTION

One embodiment relates to a mobile robot. The mobile robot includes a frame and a plurality of legs. Each leg includes a motor coupled to the frame. The motor includes a motor arm and a spring attachment point. The motor is arranged to rotate the motor arm and the spring attachment point. A spring is coupled to the spring attachment point of the motor and the leg. The leg includes a track shaped to receive the motor arm, and is coupled to the spring such that the motor arm is within the track. A control system controls the motors to cause the mobile robot to move.

In an aspect each leg may include a leg spring post within a cavity, and the leg spring post is opposite the track in a vertical direction and across the cavity from the track, the spring attachment point of the motor including a motor spring post opposite the motor arm in the vertical direction; and a first end of the spring may be coupled to the motor spring post and a second end of the spring coupled to the leg spring post so that the spring extends from the leg to the motor in the vertical direction; or the motor arm may extend outwardly from an axis of rotation of the motor and taper from a wide end closer to the axis of rotation to a narrow end further from the axis of rotation, and the track of the leg is shaped to receive the motor arm by tapering to match the motor arm; or the track may be shaped to receive the motor arm by being wider than the motor arm to allow the motor arm to slide within the track; or the motor may be coupled to the frame by an additional motor, wherein the motor has a first axis of rotation and the additional motor has a second axis of rotation perpendicular to the first axis of rotation, and wherein the control system controls roll and pitch of the leg by controlling the motor and the additional motor; or the leg may include an upper section and a lower section coupled together by an additional motor configured to control a pitch rotation of the lower section with respect to the upper section; or the mobile robot may comprise four legs and the control system may cause quadrupedal motion by controlling the four legs; or the robot may further include a head coupled to the frame by a plurality of head motors configured to control movement of the head.

In another aspect the mobile robot above may include the head with a plurality of distance sensors, and the control system may receive sensor data from the distance sensors and cause the mobile robot to move based on the sensor data. The mobile robot may further include a tail coupled to the frame by a plurality of tail motors configured to control movement of the tail, the head being coupled to a front of the frame and the tail being coupled to a back of the frame opposite the head.

Another embodiment relates to a mobile robot including a frame having a plurality of legs each coupled to the frame by a motor configured to rotate the leg. Each leg includes, at a distal end of the leg: a foot member; a paw coupled to the foot member, with a cavity, the foot member coupled to the paw such that a tip of the foot member is enclosed within the cavity of the paw. A sensor may be disposed within the cavity of the paw and coupled between the tip of the foot member and an interior surface of the paw. A control system receives sensor data from the sensors and control the motors to cause the mobile robot to move based on the sensor data.

In an embodiment the sensor may include a force sensor coupled to the tip of the foot member and configured to contact the interior surface of the paw by a lever arm, the paw being coupled to the foot member by a hinge and configured to transfer an external force on the paw to the sensor through the lever arm. Each leg may have a mechanical pantograph linkage at a distal end of the leg.

Yet another embodiment relates to a mobile robot. The mobile robot including a frame. A front leg may be coupled to the front of the frame by a front motor to rotate the front leg, and a back leg may be coupled to the back of the frame by a back motor to rotate the back leg. A front spring may be coupled between the front leg and the frame at a front spring attachment point on the frame between the front motor and the back motor; and a back spring coupled between the back leg and a back spring attachment point on the frame rearward of the back motor. A control system controls the front and back motors to cause the mobile robot to move.

The front leg may include an upper section and a lower section coupled together by a knee motor configured to control a pitch of the lower section with respect to the upper section, and wherein the front spring is coupled to the lower section of the front leg.

A further embodiment relates to a method of assembling a mobile robot. The method includes attaching a back head piece to a back side of a middle head piece, the middle head piece comprising a plurality of sensors; attaching a front head piece to a front side of the middle head piece to create an assembled head comprising the front head piece, the middle head piece, and the back head piece, the front side being opposite the back side of the middle head piece; and attaching the assembled head to a frame of the mobile robot.

Still another embodiment relates to a mobile robot including a frame, a plurality of legs each coupled to the frame by a motor configured to rotate the leg, a plurality of sensors; and a control system that controls the motors to cause the mobile robot to move. The control system may have a first controller coupled to the sensors and programmed to receive sensor data from the sensors and generate instruction commands. A second controller is coupled to the first controller and programmed to receive the instruction commands from the first controller and determine motion patterns for the legs using motion data stored locally on the second controller, or received directly from the first controller, and generate motor commands based on the motion patterns. A motor driver is coupled to the motors, and receives the motor commands from the second controller and output motor driver signals to the motors based on the motor commands. The first controller may have one or more processors and memory storing executable instructions for the processor, and the second controller may have a single loop microcontroller. The motor driver includes a multi-channel PWM servo driver to generate motor control signals. The motion data stored on the second controller includes a plurality of gaits and a plurality of postures for the mobile robot, each gait and each posture specifying target positions for the legs. The second controller may also be programmed to receive posture-related sensor data and, in response to detecting posture-related sensor data, generate adjustment motor commands. The controllers may communicate using a string communication protocol, and the first controller generates the instruction commands by sending string commands. Each string command has a header token, and the second controller parses each string command as ASCII characters or binary numbers as specified by the string communication protocol.

The mobile robot described above may further include a camera, wherein the control system controls the motors to cause the mobile robot to move. The control system detects a first face in a first image captured by the camera; determines a match with a registered user; in response to the first face matching the registered user, merges the first face with the registered user by updating a facial-detection classifier for the registered user with image data for the first face from the first image captured by the camera; and adjusts a familiarity score for the registered user and determines motion instruction commands based on the familiarity score for the registered user. The control system may also detect a second face in a second image captured by the camera; determine that the second face does not match any of the registered users; determine that the total number of registered users does not exceed a threshold number of registered users; and register a new user based on the second face by creating a new facial-detection classifier for the new user with new image data for the second face from the second image captured by the camera and assigning a new familiarity score to the new user. The control system may also determine that the second face does not match any of the registered users; and in response to determining that the second face does not match registered users and that the total number of registered users exceeds the threshold number of registered users, assign a neutral familiarity score to the second face and determine motion instruction commands based on the neutral familiarity score.

In the mobile robots described above the frame may include a plurality of conductive touch pads integral to the frame, and electrically coupled to a pin of a touch sensor to control the motors to cause the mobile robot to move based on sensor data from the touch sensors. The frame includes a spine and ribs extending from the spine, and each of the ribs includes a conductive touch pad coupled with a respective touch sensor.

In another aspect each leg section is coupled together by a second motor to control a pitch rotation of the lower section with respect to the upper section, and includes a mechanical pantograph linkage at a distal end of the lower section and a foot on the mechanical pantograph linkage. The control system causes the mobile robot to move, and maps a commanded foot location for the leg to motor control positions for the first and second motors for the leg, e.g., by accessing a lookup table with foot locations and, motor control positions calculated based on dimensions of the upper section, the lower section, and the mechanical pantograph linkage.

The control systems described in this specification may be implemented in hardware, software, firmware, or any combination thereof. As such, the terms "function" or "node" as used herein refer to hardware, which may also include software and/or firmware components, for implementing the feature(s) being described. In some examples, the control systems may be implemented using a computer readable medium having stored thereon computer executable instructions that when executed by the processor of a computer control the computer to perform steps. Examples of computer readable media suitable for implementing a control system include non-transitory computer readable media, such as disk memory devices, chip memory devices, programmable logic devices, and application specific integrated circuits. In addition, a computer readable medium used in a control system may be located on a single device or computing platform or may be distributed across multiple devices or computing platforms.

An advantage of the disclosed embodiments is the mechanism that collects force with a large paw area and make it focused onto a smaller sensor is novel.

Another advantage is the way that the face data changes over time, thus changing the familiarity score.

Yet another advantage is the use of ribs as multiple keys.

Still another advantage is the use of non-parallel pantograph to fine tune the mapping between knee angle and ankle angle.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 18 is a table showing an example communication protocol between two controllers.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

This specification describes legged robots and methods for controlling legged robots. Examples of legged robots are shown having four legs; however, the leg mechanisms, control systems, and other structural parts can be used in legged robots with other numbers of legs. The legged robots may be referred to as animal robots and programmed to imitate legged animals even though other legged robots can use the leg mechanisms, control systems, and other structural parts as described.

Figure 1:
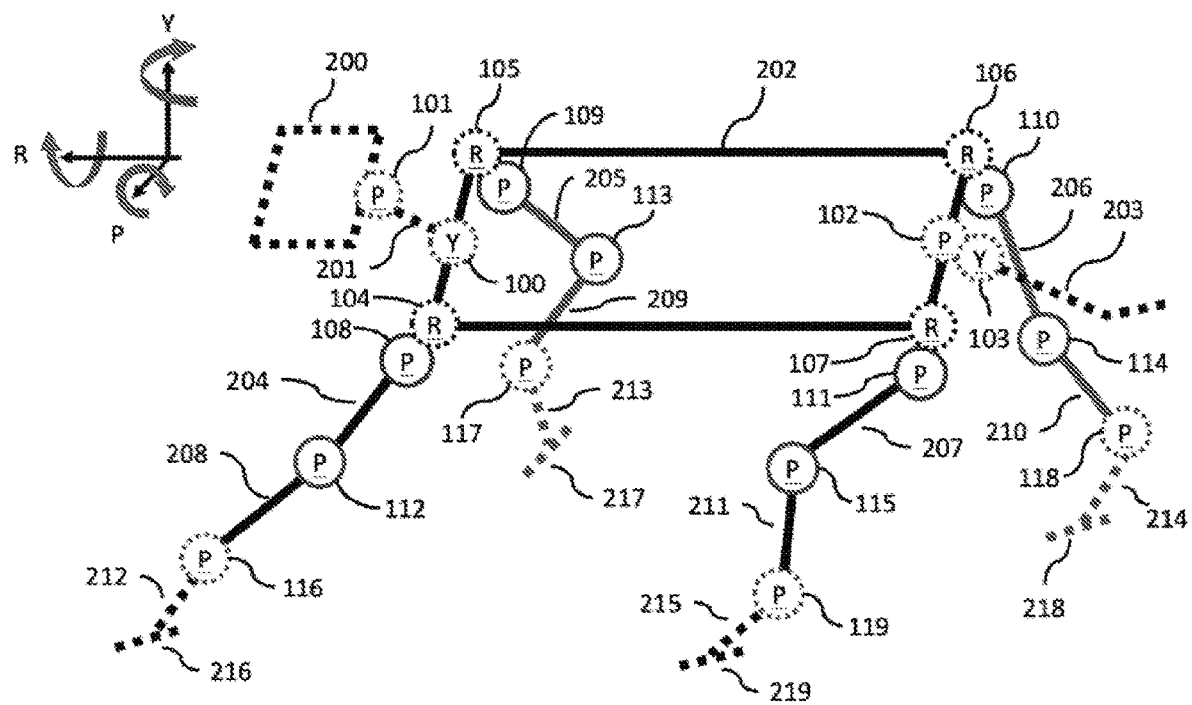
FIG. 1 is a schematic diagram of an example legged robot.

FIG. 1 is a schematic diagram of an example legged robot. FIG. 1 illustrates a mapping between an animal's joints and the robot's rotatable parts. Directions yaw, pitch, roll are marked as Y, P, R on each joint to indicate their rotation directions. Dashed parts are optional in a simpler (lite) version of the robotic system. Lead line numbers 100~119 are used to index each degree of freedom (DoF).

The robot is configured to simulate an animal's motion, e.g., the motion of a cat or other quadruped. There are many joints involved in the motion. To illustrate the motion of the robot, those joints are projected to individual servo motors as Degrees of Freedom (DoFs). Considering the symmetry and similarity between front and hind limbs' structure, the terms for corresponding body parts will be used interchangeably in later text.

Figure 2:
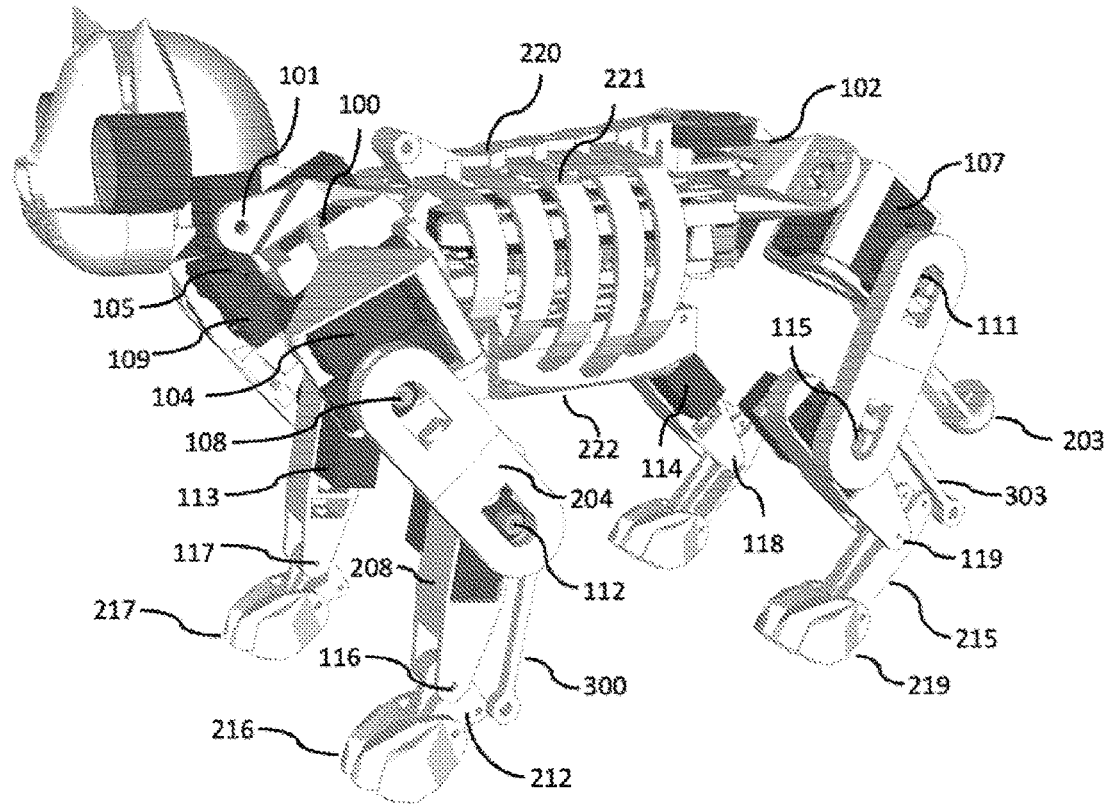
FIG. 2 is a schematic perspective diagram illustrating one example version of the robot.

FIG. 2 is a schematic perspective diagram illustrating one example version of the robot. It shows a possible implementation for all the joints shown in FIG. 1, and morphologically resembles a cat.

There are 16 active DoFs in the full version. Among them, there are two DoFs 100, 101 for head's yaw/pitch rotation, 8 DoFs 104~411 for thighs' roll/pitch rotation, 4 DoFs 112~415 for shanks' pitch rotation and 2 DoFs 102, 103 are reserved for the tail or spine. In the lite version, head and tail 100~403, shoulders' roll 104~108 and parts below shanks 116~419 can be omitted, e.g., to reduce the size, weight, and cost of the robot.

The relative location and attachment pattern between rotor and stator will make differences in efficiency and energy consumption. In the illustrated examples, each shoulder has two DoFs to let the thigh move in roll and pitch directions. The thigh is attached to shoulder servo's rotor to reduce the swinging mass (rotational inertia) during periodical movement in forward walking, while the two motors on the shoulder are relatively still to the major body mass. The knee has one pitch DoF, it also drives the passive DoF on the ankle (discussed in the next section).

In addition, the head and shoulder DoFs are tilted by a certain degree (between 30 and 60 degrees) to achieve a better morphology that resembles an animal. It is also beneficial when the robot is in sitting posture. The head will be able to rotate in perfect yaw/pitch directions. It is more accurate to control the rotation of head's sensors to track target objects. There are also passive joints that can move under certain mechanic and geometric constraints. Four passive joints are in the wrist and ankle, three passive joints are in the neck, and two passive joints are in the shoulder. Passive joints are described further below.

Some parts of the robot can be made of conductive materials (such as conductive plastics or rubber) directly as touch pads. The design reduces the use of adhesive metal pads and provides better sensitivity and integrity. Different conductive parts are well separated by insulators. For example, the spine and rib structure is designed as a flexible cover to hide and protect the circuit and wires. The ribs are also designed as touch pads to feel user's patting, or as keyboard for instant input or control.

Figure 3:
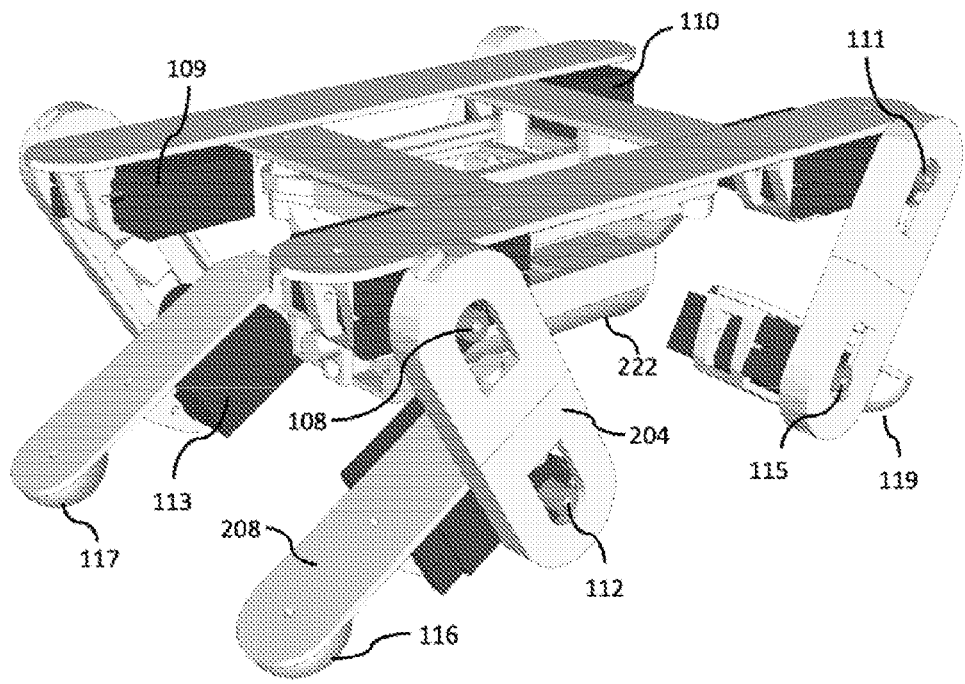
FIG. 3 is a schematic perspective diagram illustrating a simpler (lite) version of the robot.

FIG. 3 is a schematic perspective diagram illustrating a possible implementation as a simplified quadruped robotic platform.

Figure 4:
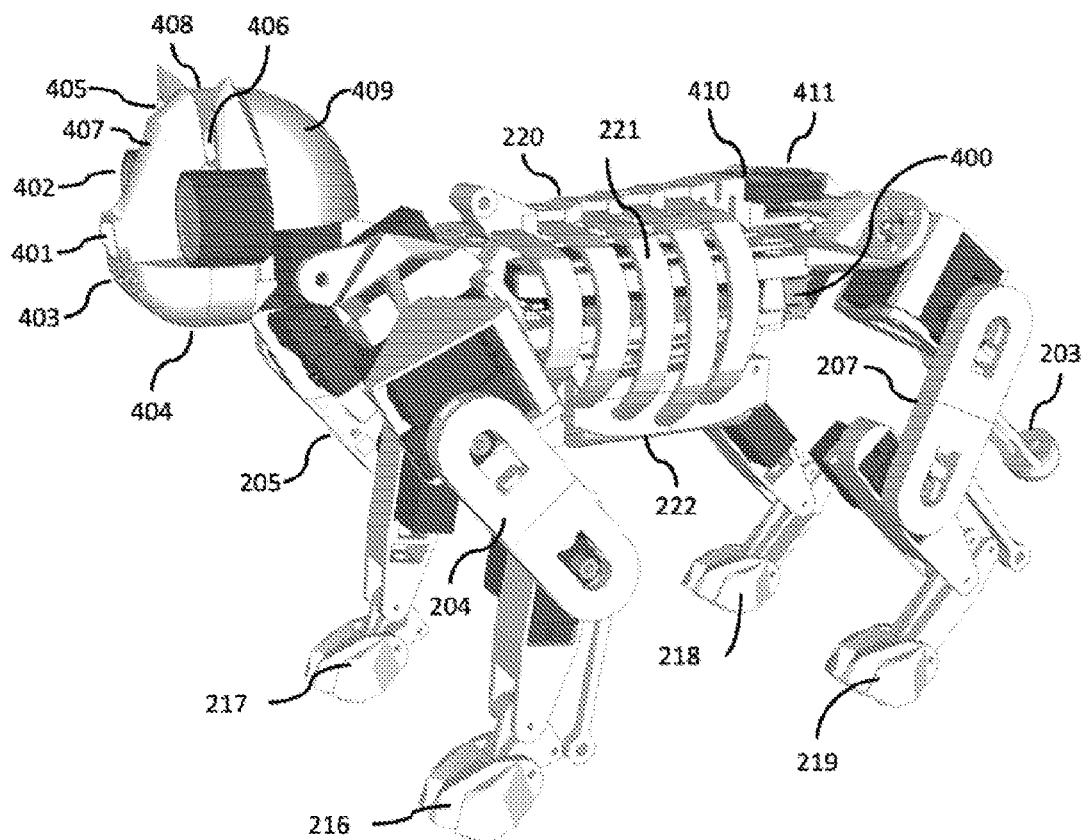
FIG. 4 is a schematic diagram showing the sensors' configuration on the robot.

FIG. 4 is a schematic diagram showing the sensors' configuration on the robot. The robot can have multiple sensors for environment perception. For example, the robot can have all or some of the following sensors.

There are two distance sensors 405, 406 installed in the ear location for detecting obstacles on both fronts. There is one distance sensor tilted by 45 degrees under the chin 404 to detect cliffs and lower obstacles. The three sensors form a triangle to provide depth information in front of the head. There is a night vision or conventional camera installed at the position of nose for computer vision and video streaming. There is one gyroscope/accelerometer located in the body 400. There are multiple microphones 412 and speakers 403 distributed on the robot's body.

There are multiple touch sensors installed on the robot. Touches are treated as both spatial and temporal dependent sequences rather than independent events. For example, if the sensors on back are triggered in order, then it indicates that the user is patting the robot; if multiple sensors are triggered at once, then it indicates that the user is holding the robot. The robot also has preferences to different location and sequences of touching. It will behave differently to encourage those preferred touches. In an embodiment touch pads may be integral to the frame. E.g., the touch pads may be integrated in the head pieces 407,409, rib cage 221 and limbs 204~211.

In some examples, the back has a "spine+rib" structure, and those ribs are conductive and function as touch sensor pads. In some other examples, the whole back is a touch screen to detect a higher resolution of touch events and also display information. Table 1 shows an exemplary touch sensor relationship.

TABLE 1

| Touch Sensor Event | Perception | Reactions |
| --- | --- | --- |
| Any touch sensor is triggered | Human existence | Stop current job; Look for faces using camera. |
| More than 50% sensors triggered | Human embracing | Shut down motors; Talk. |
| One leg sensor triggered | Human holding | Shut down motors on that leg. |
| Back sensors triggered in order | Human patting | Shut down motors; Purr; Talk. |
| Head & Face triggered | Human patting | Raise and rotate head. |

Figure 5:
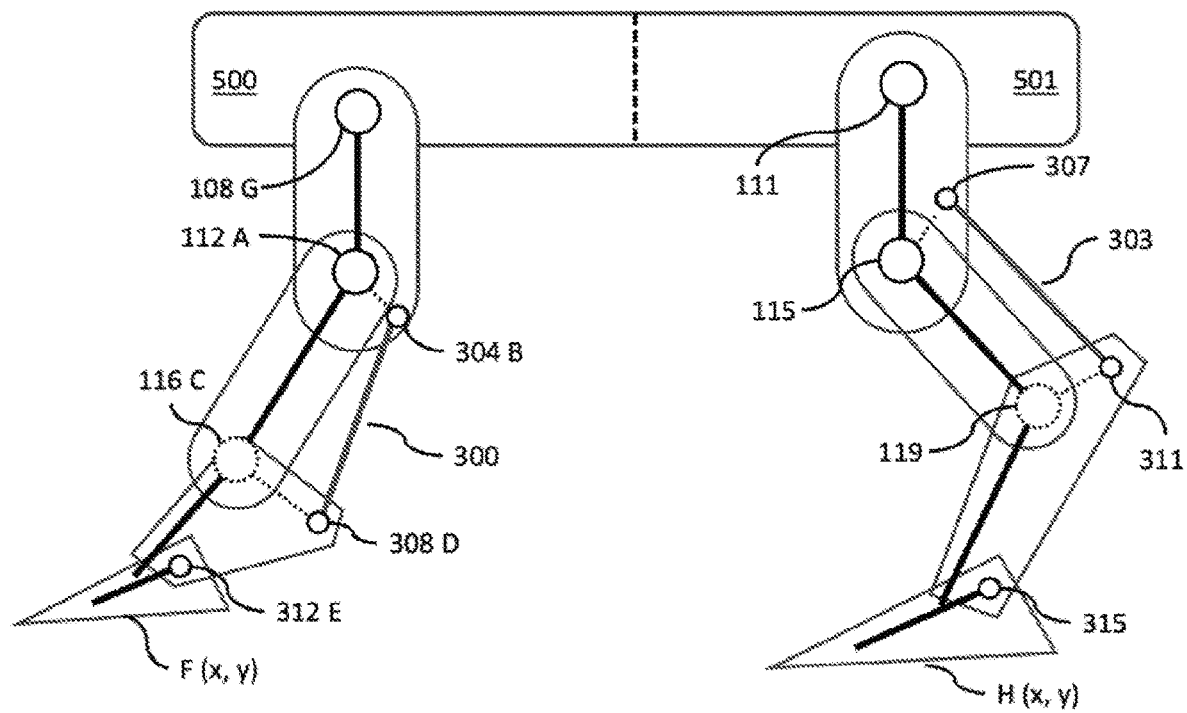
FIG. 5 is a schematic diagram showing the pantograph mechanism to achieve a nonlinear passive DoF at wrist or ankle joint.

FIG. 5 is a schematic diagram showing the pantograph mechanism to achieve a nonlinear passive DoF at wrist or ankle joint. To achieve vivid movement on robotic animals, a large number of DoFs may be required. However, every added DOF will increase the system's complexity, cost, weight, power consumption and chance of failure. In the illustrated examples, the passive DoFs in wrist and ankle joints 116~419 are achieved by a pantograph mechanism.

Unlike some conventional pantographs, which may be perfect diamond shaped pantographs, the quadrilateral has a specifically designed geometry to achieve nonlinear dependence between the knee angle and the ankle angle. There is a weak torsion spring at the wrist and ankle 116~419 for lifting the foot (during swing phase), and a strong elastic tendon 300~303 is used in the backward edge of the quadrilateral to deliver driving force. It also acts as a buffering connection for the knee motors. As shown in FIG. 5, the ankle angle for a given knee angle is solved under those geometry constraints, and then fitted using trigonometry functions. This function will be used to derive the mapping between leg joints' angles and their corresponding paw location.

Because each foot's location is decided by two independent servos, trigonometric functions are used to derive their location in Cartesian coordinates. The calculation is complex and may take a long time to complete. On the other hand, during walking their values change periodically. In some examples, a pre-calculated lookup table is built to map servo angles(G,A) to front foot location F(x,y). The hind foot location H(x,y) is calculated using a similar relationship. Notice that on the full version, the relative location between A, B, C, D defines the geometry constraint on quadrilateral ABCD. ABCD doesn't have to be a perfect diamond shape. An additional lookup table mapping angle A to angle C is also created to locate the foot-ground contact F. On the lite version, the leg ends at wrist joint. Point C locates foot-ground contact directly.

Figure 6:
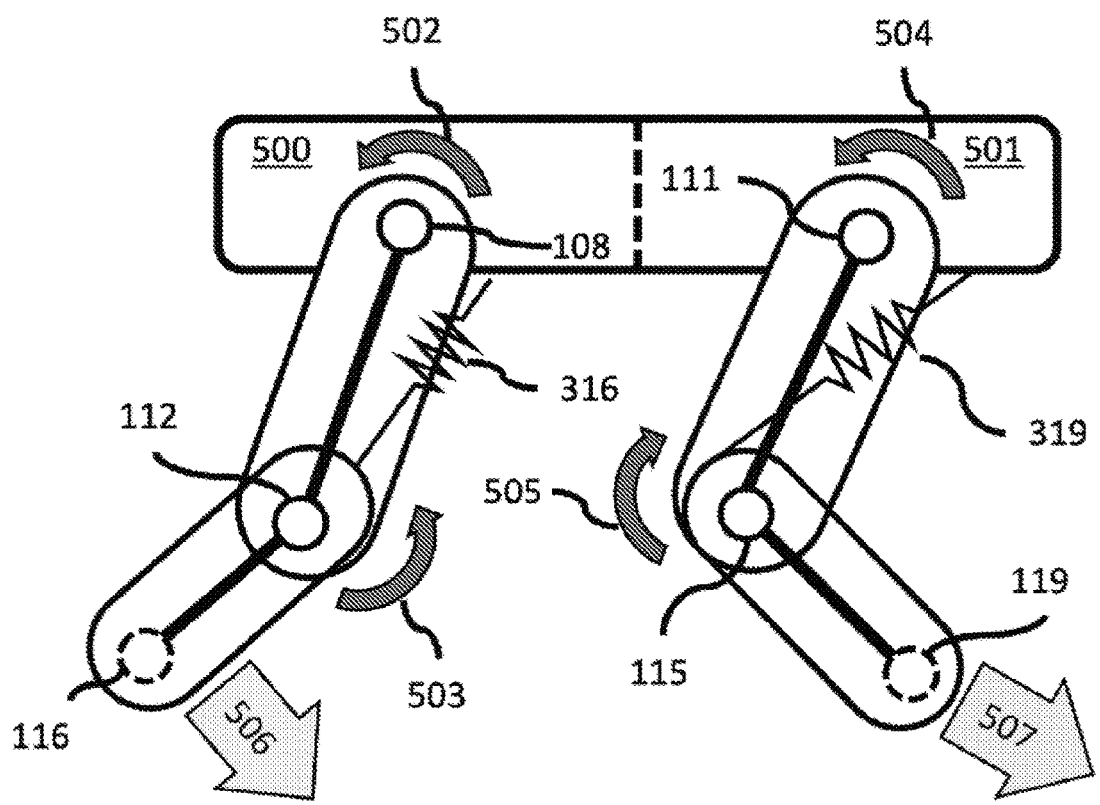
FIG. 6 is a schematic diagram showing the elastic connection between legs and major body to increase pushing force.

FIG. 6 is a schematic diagram showing the elastic connection between legs and major body to increase pushing force. When a robot is walking, its feet generally experience four stages: backward stance, lifting, forward swing, and dropping. During stance, the force on legs does work and push the robot move forward. During swing stage, the legs move forward in the air and do not require as much force as stance stage. However, current actuators have a generally uniformed power output. That means the maximal cargo capacity is constrained by the actuator's performance during stance stage.

In the robot as shown in FIG. 6, there are extension springs 316, 319 connecting the body and knee. During swing stage, the spring is stretched and stores elastic potential energy. During stance stage, the spring releases the energy and provide additional torque 502~505, resulting assistive force 506, 507 to push the robot forward.

Note that the limb mechanism in the front 500 and back 501 can be considered as building blocks. Although the front and back knee joints of the current robot are arranged as ><, they can also be arranged as >> or <<. The spring linkage will then adopt the corresponding configuration.

Figure 7:
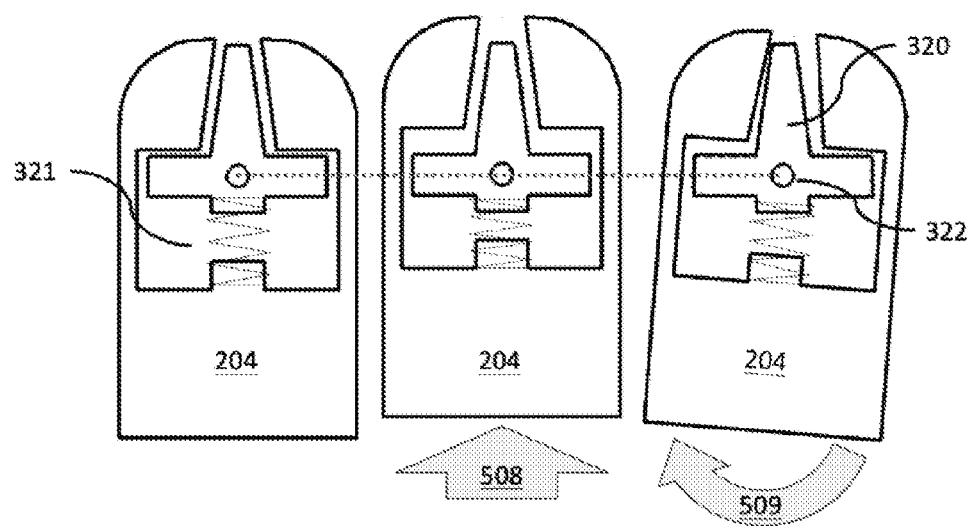
FIG. 7 is a schematic diagram showing the flexible linkages between the servo arm and the thigh.

FIG. 7 is a side view showing the internal flexible connection between a limb and a servo motor arm, and FIG. 7 shows the limb at rest (on the left), under pressure (in the middle), and under a torque (on the right).

The motors on legged robots rotate periodically, and the legs may encounter unexpected obstacles or shocks. If there is no buffering mechanism in the linkage to motors, the motors will be easy to wear or break. Elastic and suspension structures have been used in some conventional mechanical systems. However, such structures are rare on small robots or toys due to increased size, weight, cost and complexity.

FIG. 7 shows a simple elastic mechanism to link the leg 204 and servo arm 320. As shown in FIG. 7, the leg is not screwed with servo arm directly, but has a track that allows the servo arm to slide and rotate. The servo arm is slightly pushed by a damper spring 321 to its base position. When external force is smaller than the compress force of the spring, the connection will be the same as a screwed-on arm. When the force is larger than tolerated value, the spring will compress, and the servo arm will be able to slide in parallel direction of the leg 508 or rotate in tangent direction 509. Note that as compression and torque could happen simultaneously, the servo arm is also able to slide and rotate at the same time. If the force is even larger, the servo arm will slide to the opening of the track and jump out. Such a weak-link-of-chain can smoothen sudden collision to gradual load, and avoid damaging the more expensive servos. Its structure can be restored by re-installing the spring and servo arm into the track.

The structure also excludes the need for screws and is easier to install, maintain, and replace than some conventional structures. In some cases, the track may be made by multiple parts for the ease of manufacturing and assembling.

Figure 8:
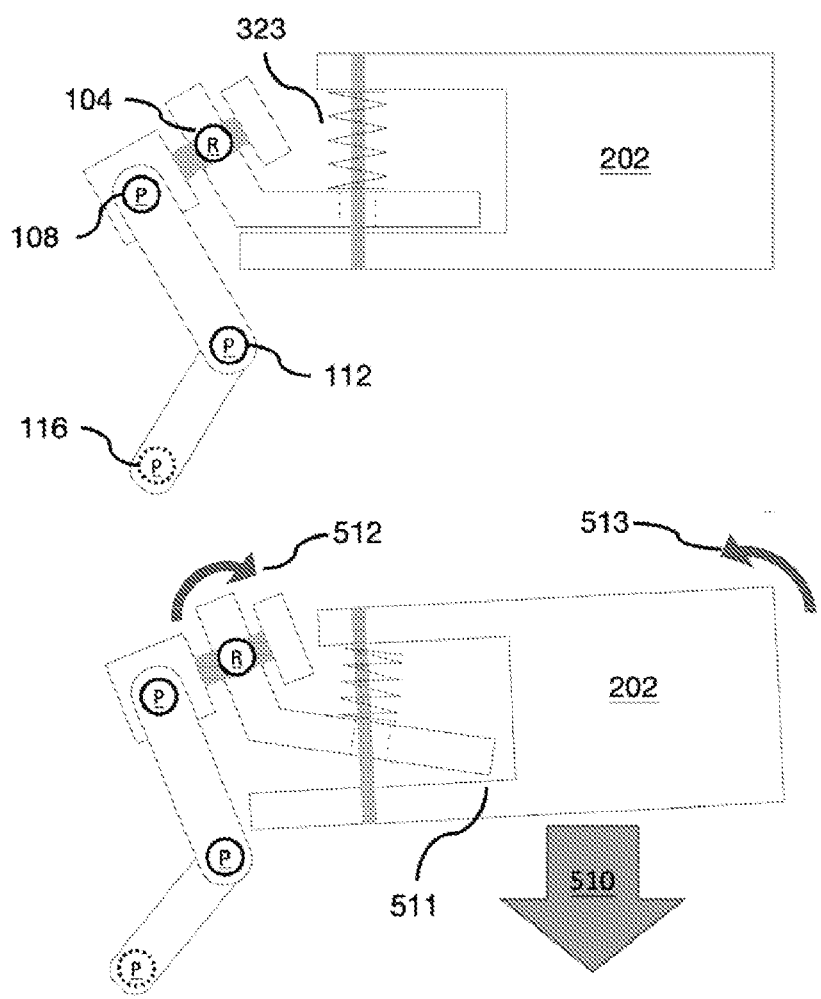
FIG. 8 is a schematic diagram showing the flexible linkage between a major body mass of the robot and a shoulder of the robot.

FIG. 8 is a schematic diagram showing the flexible linkage between a major body mass of the robot and a shoulder of the robot. Thick arrows 512, 513 indicate possible rotation directions under certain forces.

When the robot is performing walking or jumping motions, the wobbling of its center of mass will destabilize its motion and apply periodical press on its shoulder frame. The frequent load and unload of pressure will eventually lead to a fracture. As illustrated in FIG. 8, the major body mass 202 is supported by the shoulder 104 and they are connected by two damper springs 323. When the center of mass is dragging the body frame downward 510, the contact 511 between body frame and the shoulder frame becomes a pivot to allow relative rotation. The springs are compressed to absorb shock. The elastic connection helps to stabilize the robot during motion and protects the shoulder frame during motion or collisions.

Figure 9:
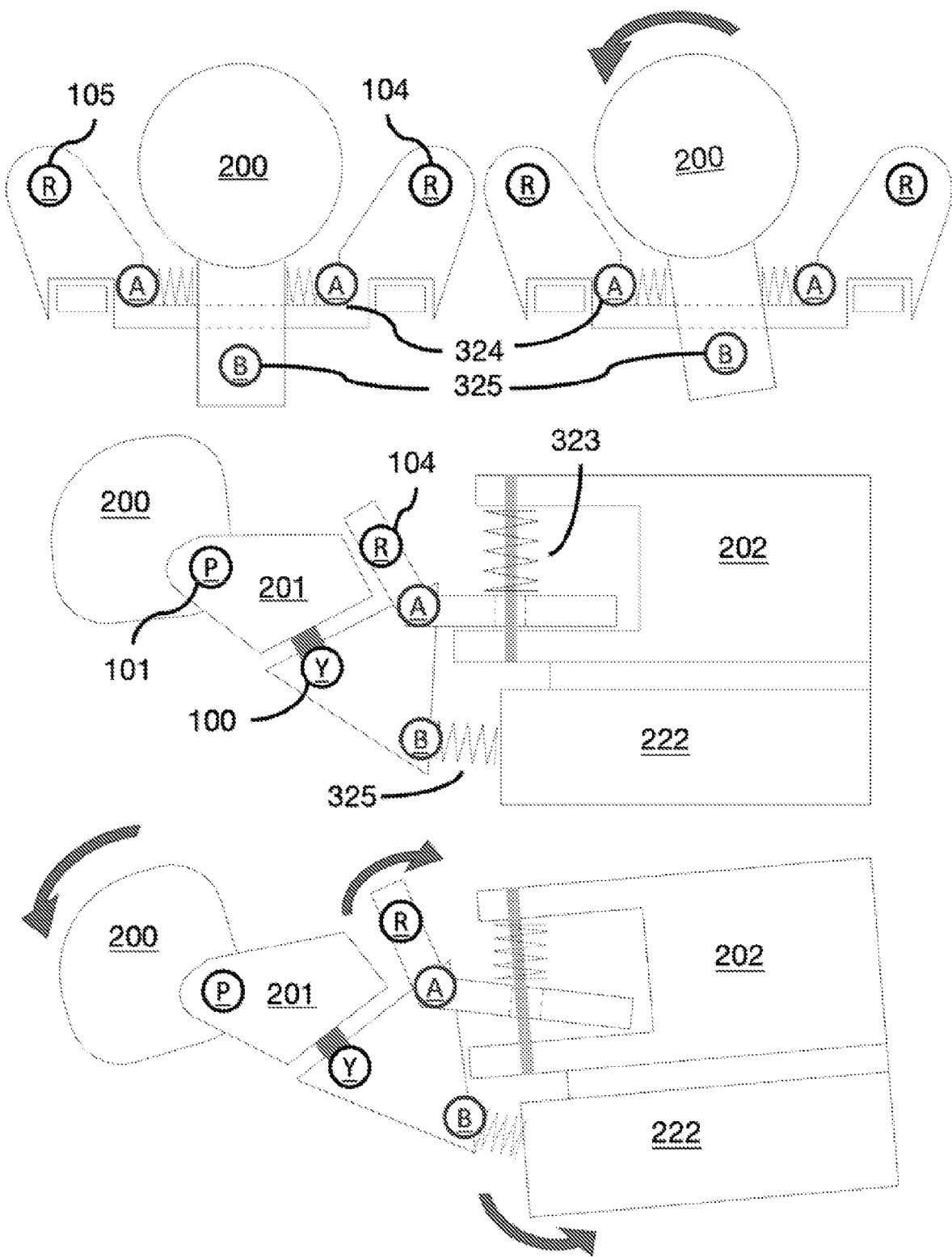
FIG. 9 is a schematic diagram showing the flexible linkage between neck, shoulder and major body mass.

FIG. 9 is a schematic diagram showing the flexible linkage between neck, shoulder and major body mass. Thick arrows indicate possible rotation directions under certain forces. The neck is connected to the body through three damper springs 324, 325. Two springs 324 are installed between the shoulder and the neck. They define a flexible pitch axis and replace the need for bearings on that axis. The third spring 325 is installed between the bottom of neck and the belly. It helps to reduce the shake of the head and protect the it during head-on collision.

Figure 10:
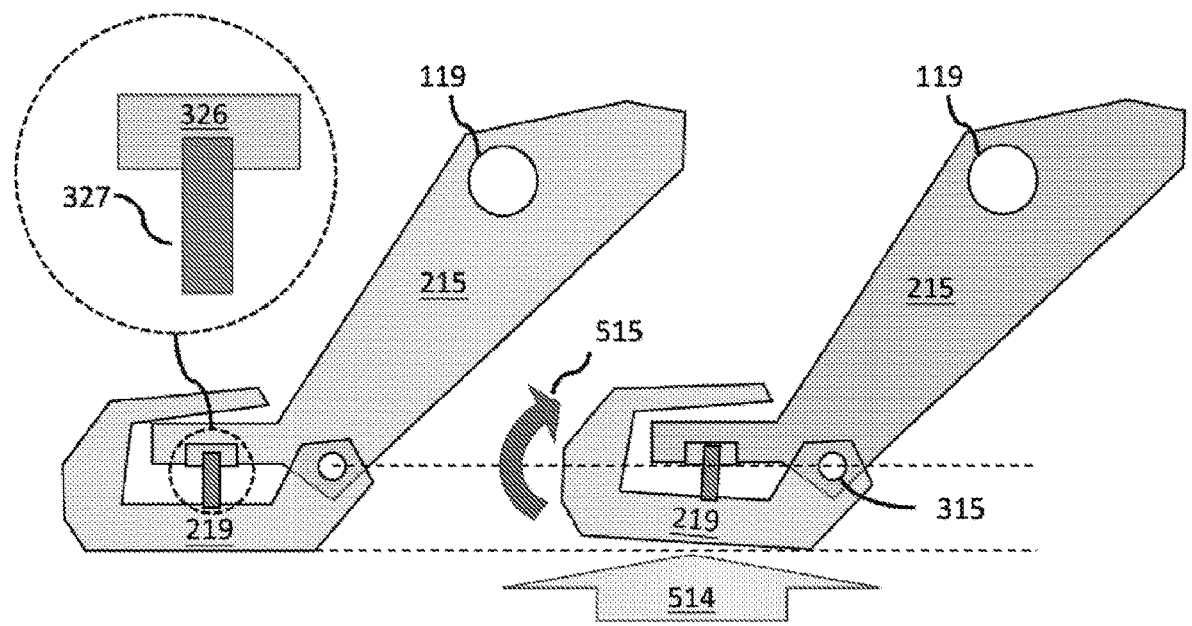
FIG. 10 is a schematic diagram showing the lever structure between paw and toe.

FIG. 10 is a schematic diagram showing the lever structure between paw and toe. The robot needs to detect the pressure on feet to allow more adaptive motion and interaction. As illustrated, a rubber-like paw 219 covers the whole tip of foot to collects any force 514 applied on the foot. A hinge 315 allows it to rotate by a small angle. The rubber-like paw acts as a buffering layer between the ground and foot.

The paw also isolates the sensor from external dusts or liquid, and can be easily taken off for washing or replacement. The force sensor 326 resides in the tip of foot and pushes the paw through a long lever arm 327. The long lever arm acts as an amplifier for the force sensor. As long as the external force on the paw is larger than a certain threshold, the force sensor will be triggered and send signals to the processor for status analysis or movement adjustment. The use of the lever arm can improve the sensing range of the force sensor.

Figure 11:
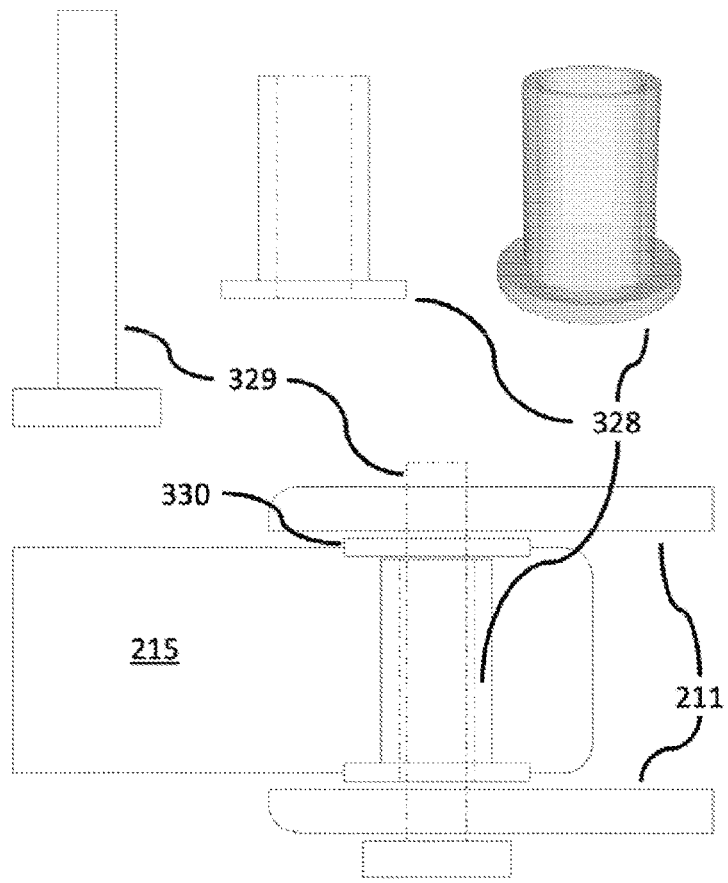
FIG. 11 is a schematic diagram showing the through hole rivet as a potentially inexpensive alternative to the use of ball bearings.

FIG. 11 is a schematic diagram showing the through hole rivet as a potentially inexpensive alternative to the use of ball bearings. As shown in FIG. 9, a "rivet 328+screw 329+washer 330" structure is used throughout the robot's movable connections as an alternative to ball bearings. It avoids direct contact between plastic parts to reduce wearing, and it also reduces rotational and sliding friction along the rotation axis.

Figure 12:
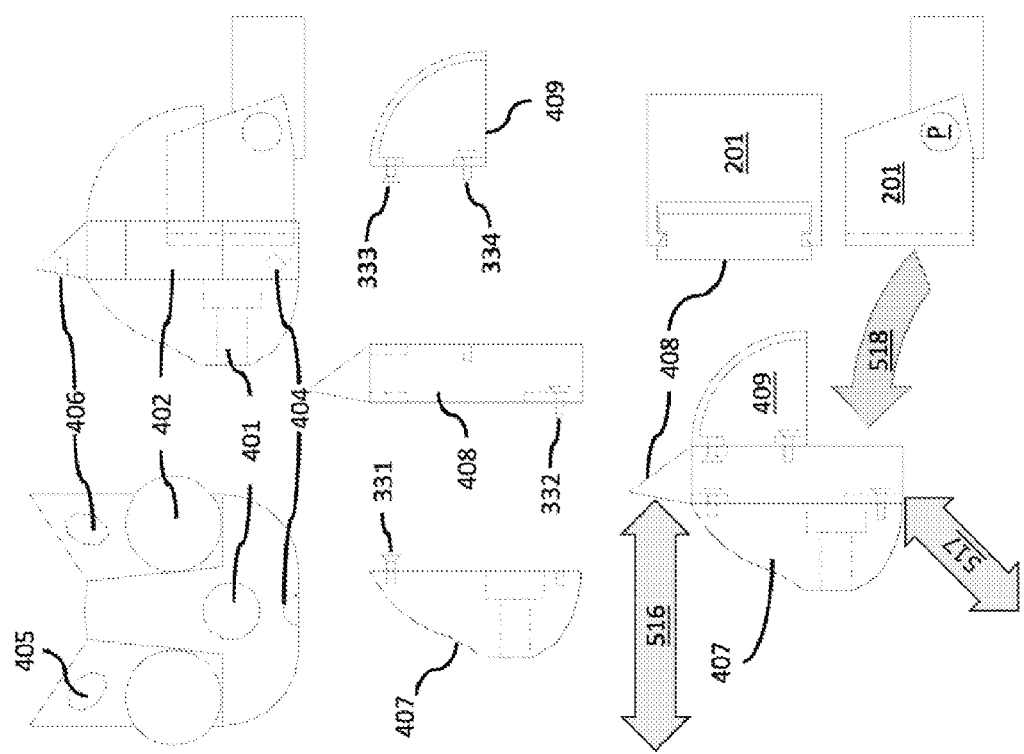
FIG. 12 is a schematic diagram showing the structure of head, sensor configuration, and clip-on mechanism.

FIG. 12 is a schematic diagram showing the structure of head, sensor configuration, and clip-on mechanism. The head 200 is the major place for installing sensors. It's also vital for user interaction. To make the sensors easy to install, the head is designed with a "sandwich" structure, where the majority of sensors are installed on the middle layer 408 of the head, while the face 407 and back head 409 are just covers and can be easily removed. To hide the screws 331~334 from the robot's surface, the screws are distributed as shown in FIG. 12, and should be installed following the numeric order. Screw 331, 333 are installed beforehand and can slide into the semi-open holder on middle layer. Screw 332 and screw 334 are screwed on later to fix the face and the back head.

There are also two dents on both sides of the middle layer 408. A clipper structure 201 on the neck can hold the head by the dents and connect the head to the neck. This clip-on design makes maintenance easier and helps to protect the robot during head-on collisions.

Figure 13:
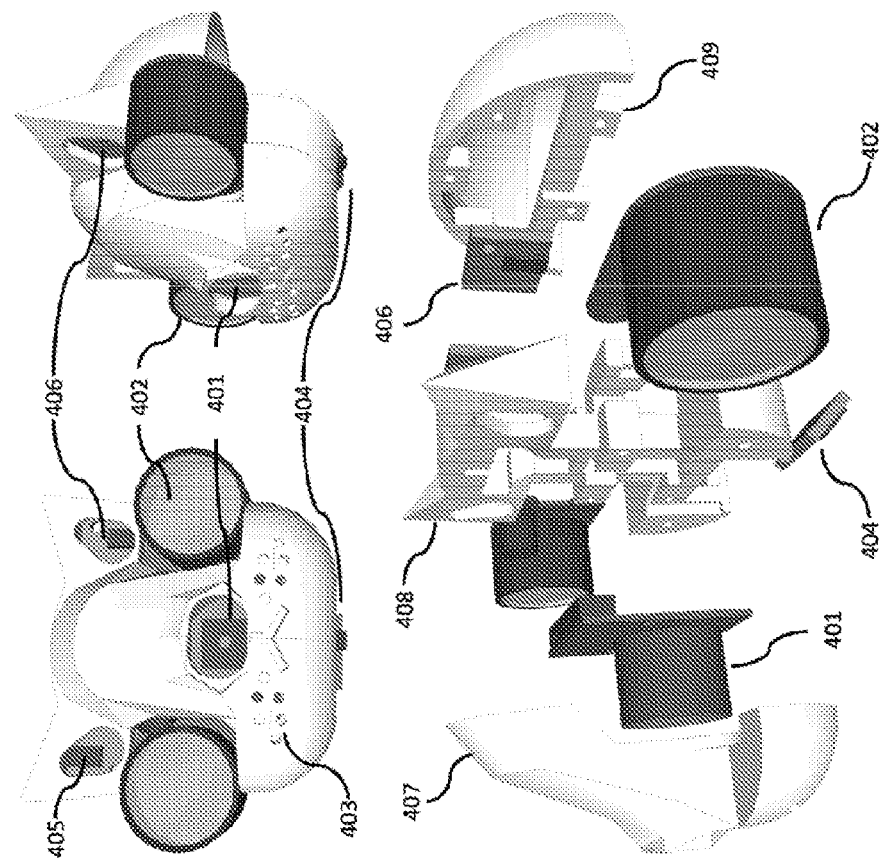
FIG. 13 illustrates an exploded three-dimensional view of a robot head.

FIG. 13 illustrates an exploded three-dimensional view of a robot head following the design described in FIG. 12. The robot head has a middle head piece 408, the front 407 and back 409 head pieces are attached to the front and back sides of the middle head piece. The camera 401, eye light/display 402, speaker 403, and distance sensor 404~406 are installed on the middle piece. The distances 516 and 517 are measured by the distance sensor 404~406. The face 407 and back head 409 are made by conductive materials as touch pads and are isolated by the middle piece 408. The clip on neck 201 is attached to the middle piece 408 in the direction of 518.

Figure 14:
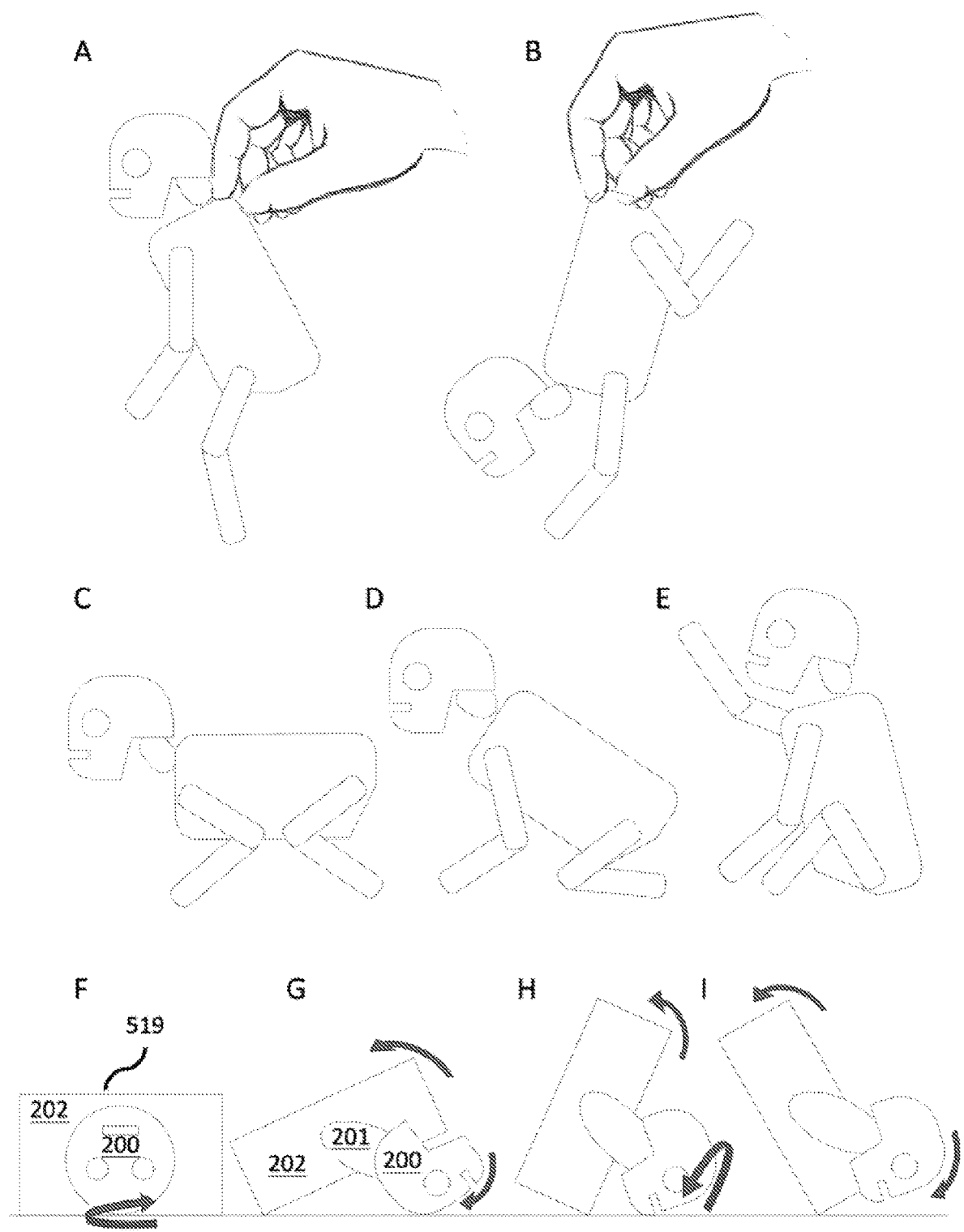
FIG. 14 is a schematic diagram showing several postures and their transitions.

FIG. 14 is a schematic diagram showing several postures and their transitions. The robot's body posture is directly defined and controlled by servo angles. Smooth transition between postures leads to continuous motion to perform certain tasks. The servo angles are stored in an integer array, with each angle ranging from −128 to 127 degrees, though effective angles are between −80 to 80 on certain servos. A time series of the angle array defines how the robot move over time. Another list is kept to define the indexed servos that will be active during the transition.

Generally, there are two types of transitions. One is angle driven transition. Given the initial and final state of the servos, a gradually changed angle interval is calculated based on intended time steps and duration. This transition is convenient because each state can be directly defined by looking at the angles of each joint, and the intermediate states can be linearly interpolated in real-time without storage in memory. However, because the paw's motion is the result of multiple servos, their combined linear angular motion will not lead to a linear trajectory of the paw. So this transition is generally applicable when the intermediate trajectory is not going to encounter any obstacles in the path.

Another finer transition is required for better controlled motion, such as walking. The angle of trajectory of the paw is derived from certain geometry and time constraints. The servos' angles are then solved with inverse kinematics for given Cartesian coordinates of the paw. The angles are saved to memory for building a lookup table. The table is used later to map certain paw trajectory in Cartesian coordinates to a time series of angle arrays.

FIGS. 14A-B illustrate a scruffing by neck behavior. Baby animals share a behavior that if scruffed by neck, they will stop moving so that their parents can carry them around. The presented robot simulates this behavior in the same situation. If the sensors detect a scruffing event, it will drop all its legs and shut down all the motors so that people can move it around. A similar behavior also happens when the robots is lifted by the hip or tail.

FIGS. 14C-E illustrate a stand-up behavior. The robot has three stable postures that does not require powered motors to stay. The first is when the body is flat and properly supported by its legs; the second is when the body is tilted by around 45 degrees with a sitting posture; the third is when the body is almost vertical and only supported by its hip and hind legs. The third one requires a certain sequence of movements to break the gravity potential barrier. It starts from the sitting posture. With its front legs pushing the ground and hind legs spreading out, it will be able to tilt to about 75 degrees. At the same time, its hind legs will first stretch out and then bend to push the ground. After that, the robot will be vertical, supported by its hip and two ankles. Both front legs will be freed from the supporting functionality to allows more movements and human interaction.

The robot will shut down servos after reaching these stable postures to save power and reduce noise and wear of the servos, unless external stimuli triggers other motions or adjustments.

FIGS. 14F-I illustrate a "turtle-rolling" flip-recovery sequence. A robot should be able to roll back if flipped over as shown in 519. It's actually one advantages of legged robots over wheeled vehicles. Some legged robots are able to roll back by rotating their shoulders over 90 degrees, or with a long arm pushing from its back. To achieve a more natural movement pattern, the presented robot adopts a "turtle-style" roll back pattern using its neck and head movements. Once flipped over by accident, the robot raises its head 200 to lean its back to one side. The back of its head will be supporting the body and the roll angle of body 202 is about 30 degrees. It then rapidly turns its neck 201 in yaw direction and support the body with its face. The legs on the ground side will stretch out and increase the roll angle to 75 degrees. In the end, the robot will nod its head to recover the robot back to normal order.

Figure 15:
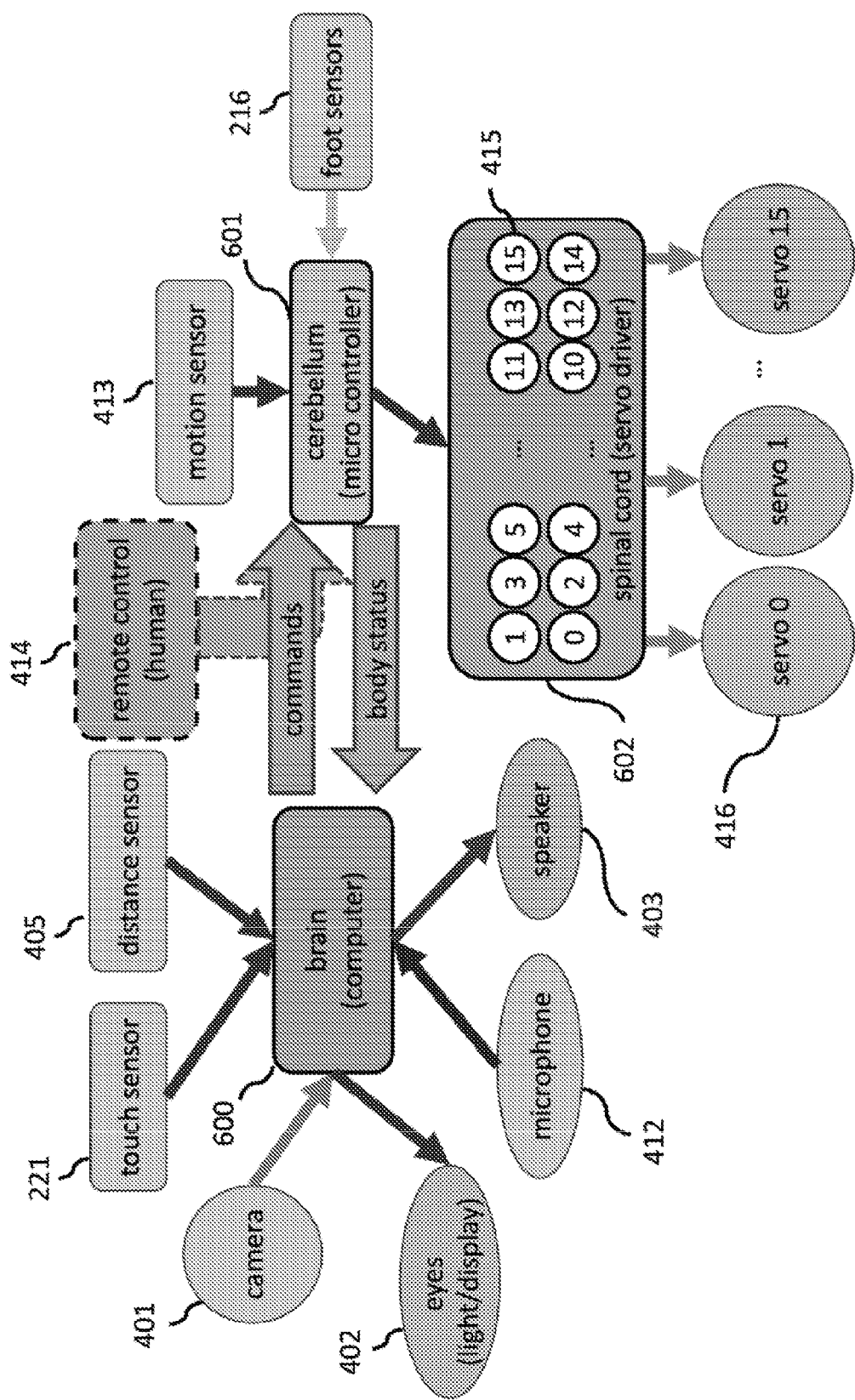
FIG. 15 is a schematic block diagram showing an example circuit configuration of the robot.

FIG. 15 is a schematic block diagram showing an example circuit configuration of the robot. The full version robot's motion is controlled by three levels of controllers, which bionically resembles those of an animal. The first level controller 600 (brain) is an artificial intelligence (AI) or human-controlled signal generator. It analyses complex sensor data, precepts the robot's situation and send abstract instruction commands to the middle level controller 601. According to different scenarios, AI and human instructions will make different contribution on the robot's final decision.

The second level controller 601 (cerebellum) is a single loop microcontroller. It reads the instructions from first level controller 600 and generate proper motion patterns. Those instinctive behaviors, such as basic gaits and postures, are stored locally on the microcontroller. The microcontroller also reads posture related sensor data, and apply instant adjustments to external disturbances, such as balancing and flip recovery. The electronics 412~416 are mainly attached to or even embedded in the microcontroller's circuit board. The second level controller can also determine motion patterns by receiving motion data from the first level controller directly.

The third level 602 (spinal cord) is a multi-channel PWM servo driver. It receives the instructions for each PWM channels from the second level controller 601 and generates the actual PWM signals to move actuators to target positions. It can also be embedded in the second level controller.

When the robot is walking, its four legs move in sequences resulting discontinuous paw-ground contacts. Its center of mass will also be supported by a changing geometry. It is useful to keep a symmetric body structure and make the center of mass move along the spine direction. On small walking robots, the connectors of the servos 415 may contribute significantly to the weight of the robot and should distribute symmetrically along the spinal axis, arranged in pairs just like the nerves found in animals' spinal cord. It is also more intuitive and convenient for installation and replacement for the servos.

The lite version as shown in FIG. 3 is a "brainless" version. It may only have the lowest two control levels 601~602, while its communication ports to higher level controls 600 are still open to users.

Figure 16:
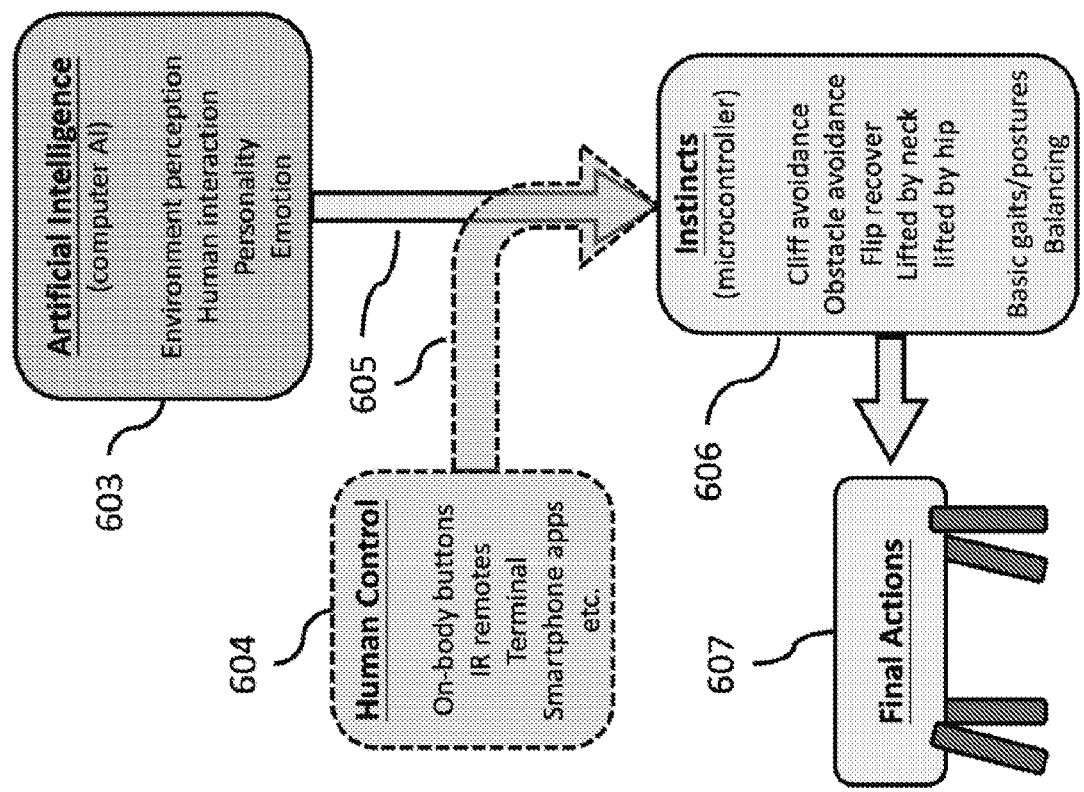
FIG. 16 is a schematic flowchart showing the hierarchy of control of the robot.

FIG. 16 is a schematic flowchart showing the hierarchy of control of the robot. The hierarchy can be implemented by the circuit structure illustrated in FIG. 15.

Figure 17:
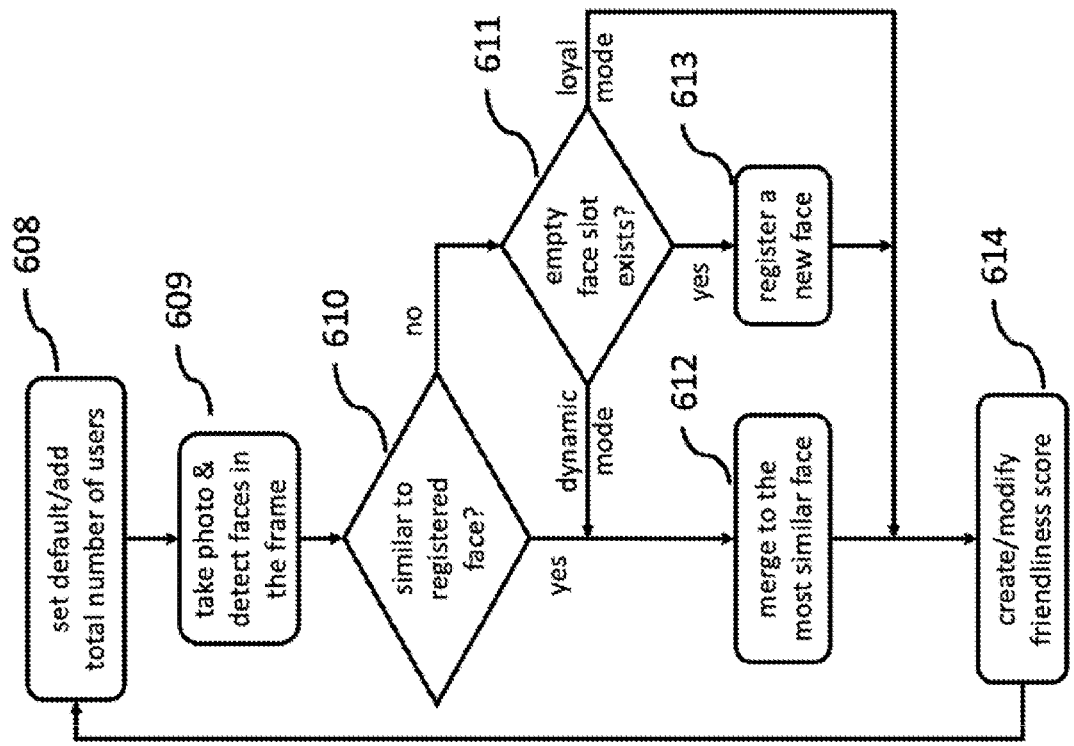
FIG. 17 is a flowchart showing the dynamic user bonding process.

FIG. 17 is a flowchart showing the dynamic user bonding process. Face detection and identification in some conventional systems require complex setup to make the robot remember users and the memory is static. The presented user bonding flowchart defines how the robot should react to different people to simulate the bonding process between real pets and their owners.

As shown in FIG. 17, the procedure is described below:

By factory default 608, there are a couple of empty user slots (such as 3 for a small family). Extra user slots could be added later. Once the robot is turned on, it will periodically take pictures of surroundings and detect faces in each frame 609. For every face detected, the robot will utilize additional facial features to register it in front view perspective 610. A newly detected face will be added to available empty slot 611. A classifier for every face is created 613. Once all slots are taken, in dynamic mode (cat mode), any later detected face will be merged into the most similar face slot 612. As time goes by, the robot will have the most accurate classifier for the most frequent user, and consider him/her as its owner. However, if the robot is adopted by other people and stop seeing its owner, it will gradually blur its impression on the old owner. In loyalty mode (dog mode), any later detected face will not affect existing classifiers and the robot will always remember its first owner.

Every saved user will have an evolving base friendliness, or familiarity, score 614. It is dynamically modified by the human-robot interaction within a short time window after the robot detects the user's face. Unsaved user/stranger will have a default score. Every individual robot can have different tendency to adopt cat mode or dog mode, and its default attitude towards strangers can also vary.

FIG. 18 is a table showing an example communication protocol between two controllers, e.g., a first controller representing the brain and a second controller representing the cerebellum. The communication between brain and cerebellum is simplified as short string commands. The string has a 1 byte header token to indicate the parsing method. The following bytes can either be parsed as ASCII characters or binary numbers according to the header token. In an example interface that accepts human inputs, the string is preferably to encode as ASCII characters for readability. In an example interface that accepts another computer's detailed instructions, the string is preferably to encode as binary characters for efficiency. This communication protocol allows both high level abstract instructions and low level control sequences between the brain and cerebellum.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the legged robot and control method as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A mobile robot comprising:
   a frame;
   a plurality of legs, and for each leg:
      a motor coupled to the frame, the motor comprising a motor arm and a spring attachment point, the motor being configured to rotate the motor arm and the spring attachment point;
      a spring coupled to the spring attachment point of the motor and the leg, wherein the leg includes a track shaped to receive the motor arm, and wherein the leg is coupled to the spring such that the motor arm is within the track; and
   a control system configured to control the motors to cause the mobile robot to move;
   wherein each leg comprises, at a distal end of the leg:
      a foot member;
      a paw coupled to the foot member, wherein the paw includes a cavity and the foot member is coupled to the paw such that a tip of the foot member is enclosed within the cavity of the paw; and
      a sensor within the cavity of the paw and coupled between the tip of the foot member and an interior surface of the paw; and
   the control system configured to receive sensor data from the sensors and control the motors to cause the mobile robot to move based on the sensor data;
   wherein, for each leg, the sensor comprises a force sensor coupled to the tip of the foot member and configured to contact the interior surface of the paw by a lever arm; wherein the paw is coupled to the foot member by a hinge and configured to transfer an external force on the paw to the sensor through the lever arm; and
   each leg includes a mechanical pantograph linkage at a distal end of the leg.

2. The mobile robot of claim 1, wherein, for each leg:
   the leg comprises a leg spring post within a cavity, and the leg spring post is opposite the track in a vertical direction and across the cavity from the track;
   the spring attachment point of the motor comprises a motor spring post opposite the motor arm in the vertical direction; and a first end of the spring is coupled to the motor spring post and a second end of the spring is coupled to the leg spring post so that the spring extends from the leg to the motor in the vertical direction;
   wherein the motor arm extends outwardly from an axis of rotation of the motor and tapers from a wide end closer to the axis of rotation to a narrow end further from the axis of rotation, and the track of the leg is shaped to receive the motor arm by tapering to match the motor arm;
   the track is shaped to receive the motor arm by being wider than the motor arm to allow the motor arm to slide within the track; and
   the motor is coupled to the frame by an additional motor, and wherein the motor has a first axis of rotation and the additional motor has a second axis of rotation perpendicular to the first axis of rotation, and wherein the control system is configured to control roll and pitch of the leg by controlling the motor and the additional motor.

3. The mobile robot of claim 1, wherein the leg comprises an upper section and a lower section coupled together by an additional motor configured to control a pitch rotation of the lower section with respect to the upper section.

4. The mobile robot of claim 1, wherein the mobile robot comprises four legs and the control system is configured to cause quadrupedal motion by controlling the four legs.

5. The mobile robot of claim 1, further comprising a head coupled to the frame by a plurality of head motors; the head motors being configured to control movement of the head.

6. The mobile robot of claim 1, wherein the head comprises a plurality of distance sensors, and wherein the control system is configured to receive a sensor data from the distance sensors and cause the mobile robot to move based on the sensor data.

7. The mobile robot of claim 1, further comprising a tail coupled to the frame by a plurality of tail motors configured to control movement of the tail, wherein the head is coupled to a front of the frame and the tail is coupled to a back of the frame opposite the head.

8. The mobile robot of claim 1, wherein
   the frame comprising a front and a back; the plurality of legs comprising at least a front leg and a back leg;
   the front leg coupled to the front of the frame by a front motor configured to rotate the front leg;
   the back leg coupled to the back of the frame by a back motor configured to rotate the back leg;
   a front spring coupled between the front leg and the frame at a front spring attachment point on the frame between the front motor and the back motor; and
   a back spring coupled between the back leg and a back spring attachment point on the frame rearward of the back motor.

9. The mobile robot of claim 8, wherein the front leg comprises an upper section and a lower section coupled together by a knee motor configured to control a pitch of the lower section with respect to the upper section, and wherein the front spring is coupled to the lower section of the front leg;

wherein the back leg comprises an upper section and a lower section coupled together by a knee motor configured to control a pitch of the lower section with respect to the upper section, and wherein the back spring is coupled to the lower section of the back leg;

wherein the frame comprises left and right sides, and the mobile robot comprises two legs on each of the left and right sides, and the control system is configured to cause quadrupedal motion by controlling the four legs.

10. The mobile robot of claim 1, wherein each leg comprising an upper section and a lower section coupled together by a second motor configured to control a pitch rotation of the lower section with respect to the upper section, and each leg comprising a mechanical pantograph linkage at a distal end of the lower section and a foot on the mechanical pantograph linkage; and the control system configured to control the motors to cause the mobile robot to move, the control system configured for mapping, for each leg, a commanded foot location for the leg to motor control positions for the first and second motors for the leg;

wherein mapping the commanded foot location to motor control positions comprises accessing a pre-calculated lookup table comprising a plurality of foot locations and, for each foot location, motor control positions calculated based on a plurality of dimensions of the upper section, the lower section, and the mechanical pantograph linkage;

wherein mapping the commanded foot location to motor control positions comprises accessing a pre-calculated table of angles relating angles between the upper and lower sections to angles between the lower sections and the mechanical pantograph linkages;

wherein mapping the commanded foot location to motor control positions comprises determining a foot-ground contact position for the foot; and wherein the mobile robot comprises four legs and the control system is configured to cause quadrupedal motion by controlling the four legs.

* * * * *